Dec. 3, 1935.                H. N. WRIGHT                 2,022,701
         CONTROLLER HITCH FOR SOIL WORKING IMPLEMENTS
                      Filed April 8, 1935
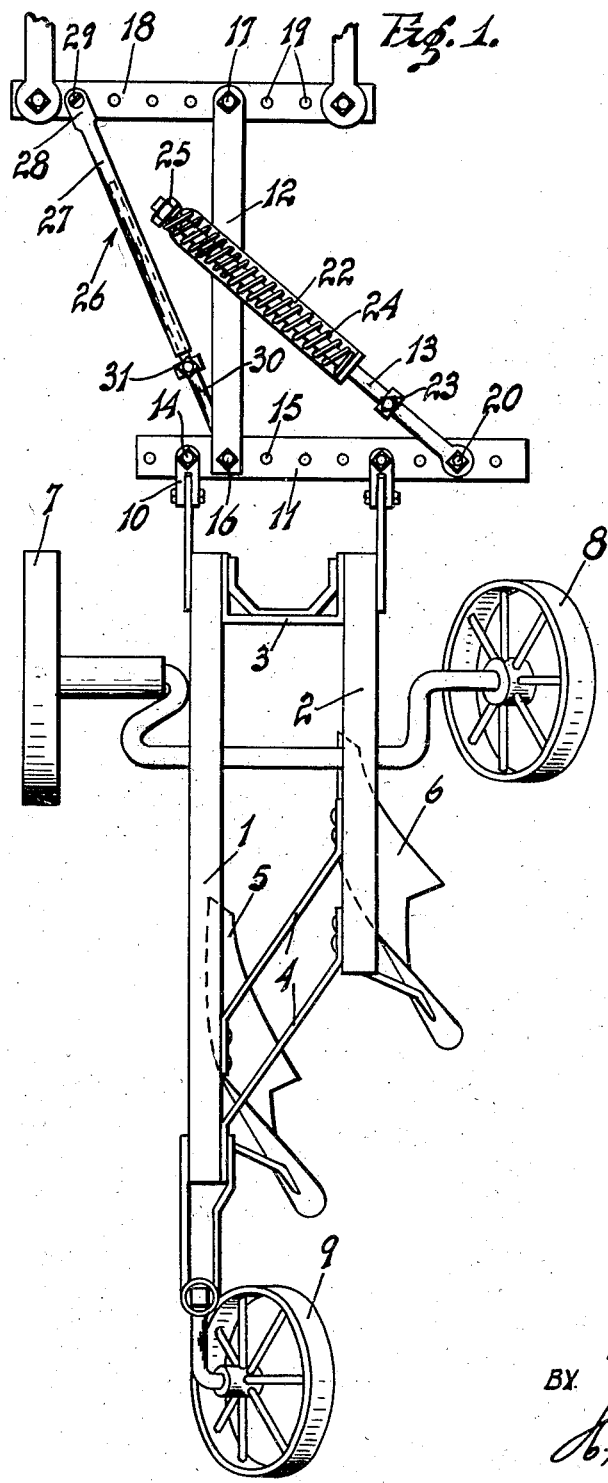
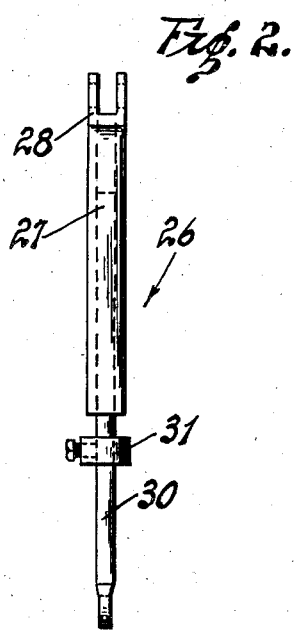
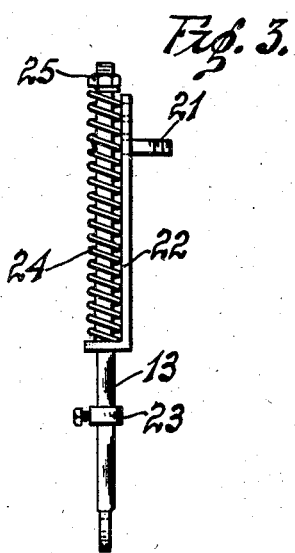
INVENTOR.
HAZELET N. WRIGHT.
BY
ATTORNEY.

Patented Dec. 3, 1935

2,022,701

UNITED STATES PATENT OFFICE 2,022,701

CONTROLLER HITCH FOR SOIL-WORKING IMPLEMENTS

Hazelet N. Wright, Pennville, Ind.

Application April 8, 1935, Serial No. 15,169

10 Claims. (Cl. 97—103)

This invention is an improvement on my Patent No. 1,960,132, issued May 22nd, 1934.

My present invention relates to a novel adjustable controller hitch particularly adapted for power-drawn earth-working implements.

My hitch will automatically maintain a constant furrow width or spacing for which the same is adjusted, whereby plow will run true to line, notwithstanding changes in the consistency of the soil, or the direction of the furrow, and particularly when making a turn or going around a corner.

An object of my invention is to provide a novel controller hitch which will cause the earth-working implement to accurately follow the tractor—both when moving in a straight line and when making a turn.

The improvement in the present invention over my previous one resides in the diagonal push rod whereby the plow is forced to one side when the tractor makes a turn, thereby causing the spring assembly to function, and causing the plow to accurately follow the tractor and to maintain the proper spacing of the furrows.

Another object is to provide a controller hitch of the character stated, which is adjustable to compensate for different kinds of soil, and also to permit turns of various arcs to be accomplished.

A further object is to provide a novel hitch with a spring assembly which is more rugged, and therefore, less likely to get out of order than in hitches heretofore in use.

Other objects, advantages and features of invention may appear from the accompanying drawing, the subjoined detailed description, and the appended claims.

In the drawing

Figure 1 is a plan view of a conventional gang plow, showing my novel adjustable controller hitch mounted thereon.

Figure 2 is a side elevation of the push bar.

Figure 3 is a side elevation of the yieldable brace bar.

Referring more particularly to the drawing, while I have shown my invention as applied to a gang plow, it is understood that other earth-working implements may be used, as desired.

The frame of the gang plow consists of a pair of beams 1, 2. The beams are spaced apart by cross bars 3, 4. These cross bars are rigidly bolted or otherwise fixedly secured to the beams. Plow shares 5, 6 are carried by the beams 1, 2, respectively, and the plow also includes a land wheel 7, a furrow wheel 8 and a rear wheel 9, all supported on the frame.

Clevises 10 are secured to the forward end of the plow frame and are adjustably attached to a draw bar 11. A pull is exerted upon the plow thru the draw bar 11, a pull bar 12, and the brace bar 13. The clevises 10 are attached to the draw bar 11 by means of bolts 14, or the like, which extend thru any one of the spaced holes 15 in the draw bar.

A bolt 16 pivotally attaches the rear end of the pull bar 12 to the draw bar 11. The pull bar 12 is preferably connected to the plow draw bar 11 at a point adjacent the plow beam 1 which is further removed from the furrow wheel 8. The pull bar 12 is pivotally connected by a bolt 17 to the tractor drag link 18. The bolt 17 may pass thru any one of the holes 19 in the drag link, i. e. it may be adjusted horizontally. The brace bar 13 is pivotally attached to the draw bar 11 by the bolt 20, and the attachment is preferably adjacent the end of the draw bar which extends beyond the frame member 2. The brace bar 13 extends diagonally forward towards the tractor and crosses the pull bar 12.

A bolt 21 depends from the bracket 22 and extends thru the pull bar. Thus, the bracket is pivotally mounted on the pull bar. The brace bar 13 extends loosely thru one end of the bracket 22 so that it can slide longitudinally to the bracket. An adjustable collar 23 on the brace bar 13 limits the longitudinal movement of said brace bar relative to the bracket 22. Thus, the forward swinging movement of the draw bar 11 is also limited.

A coil spring 24 surrounds the brace bar 13 and presses against the up-turned end of the bracket 22. The spring is retained on the brace bar by a nut 25 which screws onto the outer end of the brace bar 13. The compression of the spring 24 can be adjusted by the nut 25. It is obvious that other yieldable means can be used instead of the coil spring 24, as disclosed in my previous Patent No. 1,960,132.

The push bar 26 consists of a sleeve 27 formed with the clevis 28 on one end thereof. The push bar is attached to the drag link 18 adjacent one end of said drag link by a bolt 29, which extends thru the clevis 28. A mandrel 30 is slidably mounted in the sleeve 27, and the telescopic movement of the sleeve and mandrel is limited by the collar 31 which is adjustably mounted on the mandrel.

In operation, when the plow is drawn by a tractor with the furrow wheel 8 of the plow riding in the outermost furrow of the last turned course, and the shares 5, 6 are working in relatively soft soil, there will be little tendency of the soil acting thru the plow shares to deflect the rear ends of the plow beams 1, 2 latterly away from the last turned course. When, however, the shares 5, 6 encounter harder soil, the plow frame has a tendency—due to the increased soil resistance on the plow shares—to pivot latterly on its wheels 7, 8, causing the rear end of the frame to shift away from the previously turned furrow in which the furrow wheel 8 is riding, thereby widening the space between the outermost furrow of the last turned course and the innermost furrow of the course being produced. By my novel hitch, however, the tendency of the frame to shift latterly is offset by the action of the spring 24, the compression of the spring increasing in proportion with the change in angularity of the draw bar 11 with respect to the pull bar 12.

Now, when the tractor turns a corner to the left—as viewed in Fig. 1, the sleeve 27 of the push bar 26 will telescope on the mandrel 30 until the collar 31 is engaged. Therefore, the draw bar 11 is pushed to the right, and at the same time the spring 24 is compressed, thus holding the plow accurately in alignment and compelling it to follow the path of the tractor and to space the furrows properly on the turn, as well as on the straight-a-way.

Having described my invention, I claim:

1. A hitch for earth-working implements comprising a draw bar connected with the implement, a pull bar pivotally connected with the draw bar, a bracket on the pull bar, a brace bar having one end pivotally connected with the draw bar and its other end engaging with the bracket, resisting means whereby variations in relative angularity of the draw bar and pull bar will proportionately increase the resistance to such angular change, and a push bar pivotally attached to the hitch, said push bar moving the draw bar in a direction opposite to the turn of the tractor drawing the implement.

2. A hitch for earth-working implements comprising a draw bar connected with the implement, a pull bar pivotally connected with the draw bar, a bracket on the pull bar, a brace bar having one end pivotally connected with the draw bar and its other end engaging with the bracket, resisting means whereby variations in relative angularity of the draw bar and pull bar will proportionately increase the resistance to such angular change, a push bar pivotally attached to the hitch, said push bar moving the draw bar in a direction opposite to the turn of the tractor drawing the implement, said push bar having limited telescopic movement.

3. A hitch for earth-working implements comprising a draw bar connected with the implement, a pull bar pivotally connected with the draw bar, a bracket on the pull bar, a brace bar having one end pivotally connected with the draw bar and its other end engaging with the bracket, resisting means whereby variations in relative angularity of the draw bar and pull bar will proportionately increase the resistance to such angular change, a push bar pivotally attached to the hitch, said push bar moving the draw bar in a direction opposite to the turn of the tractor drawing the implement, said push bar having limited telescopic movement, and means to adjust the amount of telescopic movement of the push bar.

4. A hitch for earth-working implements comprising a draw bar connected with the implement, a pull bar pivotally connected with the draw bar, a bracket on the pull bar, a brace bar having one end pivotally connected with the draw bar and its other end engaging with the bracket, resisting means whereby variations in relative angularity of the draw bar and pull bar will proportionately increase the resistance to such angular change, a push bar pivotally attached to the hitch, said push bar moving the draw bar in a direction opposite to the turn of the tractor drawing the implement, and means for normally maintaining the draw bar and pull bar at substantially right angles to each other.

5. A hitch for earth-working implements comprising a draw bar connected with the implement, a pull bar pivotally connected with the draw bar, a bracket on the pull bar, a brace bar having one end pivotally connected with the draw bar and its other end engaging with the bracket, resisting means whereby variations in relative angularity of the draw bar and pull bar will proportionately increase the resistance to such angular change, and a push bar pivotally attached to the hitch, said push bar moving the draw bar in a direction opposite to the turn of the tractor drawing the implement, said resisting means comprising a spring interposed between the bracket and a stop on the brace bar.

6. A hitch for earth-working implements comprising a draw bar connected with the implement, a pull bar pivotally attached to the draw bar, a bracket on the pull bar, a diagonally disposed brace bar having one end pivotally connected with the draw bar and its other end engaged with the bracket, means on the brace bar engaging the bracket for limiting the forward movement thereof, and resisting means whereby—as the brace bar is moved rearwardly—the resistance will increase proportionately to such movement, and a push bar attached to the draw bar at one end thereof, the other end of said push bar being connected to a tractor member drawing the implement, said push bar moving the draw bar in a direction opposite to the turn of the tractor.

7. A hitch for earth-working implements comprising a draw bar connected with the implement, a pull bar pivotally attached to the draw bar, a bracket on the pull bar, a diagonally disposed brace bar having one end pivotally connected with the draw bar and its other end engaged with the bracket, means on the brace bar engaging the bracket for limiting the forward movement thereof, and resisting means whereby—as the brace bar is moved rearwardly—the resistance will increase proportionately to such movement, and a push bar attached to the draw bar at one end thereof, the other end of said push bar being connected to a tractor member pulling the implement, said push bar moving the draw bar in a direction opposite to the turn of the tractor, said resisting means comprising a spring interposed between the bracket and a stop on the brace bar.

8. A hitch for gang plows having a plurality of plow beams comprising a draw bar connected with the plow beams, a pull bar pivotally connected with the draw bar, a bracket pivotally mounted on the pull bar, a diagonally disposed brace bar having one end pivotally connected with the draw bar and its other end slidably mounted in the bracket, an adjustable collar on the brace bar engaging the bracket for limiting the forward movement of the brace bar, resisting means connecting the brace bar and bracket whereby—as the brace bar is moved rearwardly—the resistance will increase proportionately to such movement, and a push bar adapted for limited telescopic movement, said push bar being connected at one end to the draw bar and at the other end to a draft member on the tractor pulling the plow.

9. A hitch for gang plows having a plurality of plow beams comprising a draw bar connected with the plow beams, a pull bar pivotally connected with the draw bar, a bracket pivotally mounted on the pull bar, a diagonally disposed brace bar having one end pivotally connected with the draw bar and its other end slidably mounted in the bracket, an adjustable collar on the brace bar engaging the bracket for limiting the forward movement of the brace bar, resisting means connecting the brace bar and bracket whereby—as the brace bar is moved rearwardly—the resistance will increase proportionately to such movement, and a push bar adapted for limited telescopic movement, said push bar being connected at one end to the draw bar and at the other end to a draft member on the tractor pulling the plow, said resisting means comprising a coil spring around the brace bar interposed between the bracket and a stop on the brace bar.

10. A hitch for gang plows having a plurality of plow beams, comprising a draw bar connected with the plow beams, a pull bar pivotally connected with the draw bar, a bracket on the pull bar, a diagonally disposed brace bar having one end pivotally connected with one end of the draw bar and its other end telescoping the bracket; an adjustable collar on the brace bar adapted to engage the bracket and limit the forward swinging movement of the draw bar, a spring interposed between the bracket and a nut on the outer end of the brace bar for normally drawing the brace bar outwardly to maintain an adjustable angularity between the draw and pull bars, said spring being compressed when the draw bar is swung rearwardly an amount proportional to the swing, and a push bar pivotally attached to the draw bar at one end thereof, the other end of said push bar being attached to a draft member on the tractor pulling the plow, said push bar being adapted for limited telescopic movement.

HAZELET N. WRIGHT.